United States Patent [19]  
Toshimitsu et al.

[11] 3,978,196  
[45] Aug. 31, 1976

[54] PHOSPHORIC ACID PURIFICATION

[75] Inventors: Itaru Toshimitsu; Sakumi Fujii; Taketoshi Nakajima, all of Shin-nanyo, Japan

[73] Assignee: Toyo Soda Manufacturing Co., Ltd., Shin-nanyo, Japan

[22] Filed: May 7, 1974

[21] Appl. No.: 467,782

[30] Foreign Application Priority Data  
May 10, 1973 Japan.............................. 48-51194

[52] U.S. Cl................................ 423/321 S; 423/63
[51] Int. Cl.² ......................................... C01B 25/16
[58] Field of Search ................ 423/320, 321, 321 S, 423/63

[56] References Cited  
UNITED STATES PATENTS

| | | | |
|---|---|---|---|
| 1,981,145 | 11/1934 | Keller | 423/321 S |
| 2,211,119 | 8/1960 | Hixson et al. | 423/63 |
| 3,186,793 | 6/1965 | Gillis et al. | 423/321 |
| 3,348,906 | 10/1967 | Hendrickson et al. | 423/63 |
| 3,372,982 | 3/1968 | Hazen | 423/63 |
| 3,437,454 | 4/1969 | Shaw | 423/321 S |
| 3,449,074 | 6/1969 | Schertzer | 423/321 S |
| 3,479,139 | 11/1969 | Koerner | 423/321 S |
| 3,734,696 | 5/1973 | Lucid et al. | 423/63 |

FOREIGN PATENTS OR APPLICATIONS

| | | | |
|---|---|---|---|
| 593,370 | 2/1934 | Germany | 423/321 |
| 1,020,015 | 2/1966 | United Kingdom | 423/321 |
| 1,051,521 | 12/1966 | United Kingdom | 423/321 S |

*Primary Examiner*—Oscar R. Vertiz  
*Assistant Examiner*—Eugene T. Wheelock  
*Attorney, Agent, or Firm*—Oblon, Fisher, Spivak, McClelland & Maier

[57] ABSTRACT

Pure phosphoric acid is prepared from crude wet process phosphoric acid which contains pentavalent vanadium compounds by first extracting the crude acid with an alcohol of limited water solubility and then washing the extracted phosphoric acid solution with aqueous phosphoric acid, in the presence of an agent for reducing the pentavalent vanadium compounds.

12 Claims, No Drawings

PHOSPHORIC ACID PURIFICATION

BACKGROUND OF THE INVENTION

1. Field of the Invention

This invention relates to a process for purifying a crude aqueous phosphoric acid solution containing a pentavalent vanadium compound by an organic solvent extraction process. More particuarly, this invention relates to a process for preparing pure phosphoric acid, by an aliphatic alcohol solvent extraction, from crude aqueous phosphoric acid containing a pentavalent vanadium compound resulting from acid decomposition of phosphate rock, or from oxidation of crude phosphoric acid prepared by the wet process.

2. Description of the Prior Art

Phosphoric acid is manufactured by two methods: the wet process, in which phosphate rock is decomposed with a strong acid e.g. sulfuric acid, and the dry process, in which phosphate rock is calcined with coke and silica in an electric furnace. In general, the phosphoric acid prepared by the wet process contains various impurities which were present in the phosphate rock and said process has been primarily used for the preparation of fertilizers. The phosporic acid prepared by the dry process is of high purity and has been used in foods, medicines, pure chemicals and the like. Recently, various purification processes, such as organic solvent extraction or the like have been proposed for purifying crude phosphoric acid, prepared by the wet process, for ultimate use in foods, medicines, pure chemicals and the like.

In general, phosphate rock contains impurities such as Ca, Fe, Al, F, Si, etc. Considerable effort has been directed to removing impurities by many different methods. However, the separation of vanadium components has not been substantially investigated. The amount of vanadium components in phosphate rock differs depending upon the type of phosphate rock, and usually is about 150 – 250 ppm. Most vanadium components in phosphate rock are transferred to the phosphoric acid in the wet process. The vanadium components cause contamination by imparting to the pure phosphoric acid a blue or yellowish green color, and the resulting phosphoric acid cannot be used in applications where purity is essential. Heretofore, vanadium components present in the phosphoric acid as a result of the wet process have been removed by precipitation with sodium ferrocyanide or sodium chlorate. These processes are not economical on an industrial scale, and require complicated technical operations. In addition, processes for separating or recovering the vanadium components from crude phosphoric acid by an organic solvent extraction have been proposed. However, these known processes require use of a special solvent, operate in a quite complicated manner, or use special chemicals.

A need exists therefore for an effective, simple, and economical method for removing vanadium impurities from crude phoshoric acid.

SUMMARY OF THE INVENTION

Accordingly, it is one object of the invention to provide a process for preparing purified phosphoric acid, for use in foods, medicines and pure chemicals, which contain substantially no vanadium components, from crude phosphoric acid by an organic solvent extraction.

It is another object of the invention to provide a process for removing vanadium and titanium impurities from crude phosphoric acid.

It is the other object of the invention to provide a process for removing various vanadium and heavy impurities such as Cu, Pb, As, etc. from crude phosphoric acid.

These and other objects of this invention as will hereinafter become more readily understood by the following description can be attained by an organic solvent extraction with an aliphatic alcohol having a limited water solubility in which the crude phosphoric acid is first counter-currently contacted with said aliphatic alcohol and second the extracted solution of phosphoric acid obtained in the first step is washed with aqueous phosphoric acid. The process is further characterized by the addition of at least one compound which reduces the pentavalent vanadium compound in either the first or second extraction or in the crude phosphoric acid.

DETAILED DESCRIPTION OF THE PREFERRED EMBODIMENT

In general, uncalcined phosphate rock has been used for the manufacture of phosphoric acid by the wet process. Uncalcined phosphate rock contains large amounts of organic impurities which differ depending upon the place of mining. Accordingly, crude phosphoric acid obtained by the wet process will contain large amounts of organic impurities. Accordingly, the use of such phosphoric acid is quite limited. The organic impurities have previously been carbonized by calcining the phosphate rock at high temperature. It has now been found that when the crude phosphoric acid, prepared by acid-decomposition of the calcined phosphate rock with sulfuric or other acid, is contacted with a organic solvent, the vanadium content in the extracted solution of phosphoric acid will differ depending upon the method of calcining the phosphate rock.

Various methods for removing organic impurities from crude phosphoric acid prepared by acid-decomposition of uncalcined phosphate rock, such as activated carbon treatment, ion-exchange treatment and oxidation treatment, have been previously studied. These are alternatives to using calcined phosphate rock having no organic impurities.

It has now been found that the amount of vanadium components in extracted solutions of phosphoric acid prepared by contacting crude wet process phosphoric acid, which has first been oxidized-decolored with an oxidizing agent, with an organic solvent is remarkably higher than if oxidizing-decoloring is omitted. Moreover, the amount of pentavalent vanadium in crude wet process phosphoric acid prepared from calcined phosphate rock or in aqueous phosphoric acid prepared by oxidizing crude phosphoric acid obtained from uncalcined phosphate rock is quite high and the pentavalent vanadium may be easily extracted. Most importantly, when the pentavalent vanadium ions are reduced to tetra- or tri-valent vanadium ions in the organic solvent extraction of crude wet process phosphoric acid containing pentavalent vanadium ion, the vanadium ion will hardly be extracted into the extract solution.

Accordingly, the process of the invention for preparing pure phosphoric acid from crude phosphoric acid containing pentavalent vanadium compounds by organic solvent extraction with a aliphatic alcohol having a limited water solubility consists of first counter-currently contacting said crude phosphoric acid with said aliphatic alcohol and second washing the extracted solution of phosphoric acid obtained in the first step with aqueous phoshoric acid. At least one compound which will reduce the pentavalent vanadium compounds is added in either the first or second step. Suitable aliphatic alcohols include the $C_3$–$C_8$ alcohols.

Suitable compounds for reducing the pentavalent vanadium compounds included powdered or granular activated carbon, ferrous compounds and iron powder, stannous compounds and tin powder, and sulfides, such as hydrogen sulfide or sodium sulfide, and can easily be selected on the basis of the oxidation-reduction potential of the reducing agent. The reducing agent may be contacted with the pantavalent vanadium compound in solution, solid or gaseous form.

In the first extraction step, wherein crude wet process phosphoric acid containing vanadium component is contacted with organic solvent, a vessel type or tower type counter-current multi-stage mixer-settler is the preferred apparatus. The apparatus is quite effective in preparing phosphoric acid by extraction in the highest yield and with the smallest amount of solvent. The flow rate of the crude phosphoric acid and the solvent and the number of extraction stages will depend on the desired extraction rate. The extracted solution of phosphoric acid obtained in the first step is then counter-currently washed with a small amount of water or phosphoric acid containing only minor impurities, whereby the vanadium and other impurities, including metal components added to the extracted solution, will be transferred to the water phase and the extracted solution of pure phosphoric acid and the aqueous phosphoric acid containing the vanadium and other impurities may be separated. The aqueous phosphoric acid containing the impurities may be recycled to the first step.

The number of washing stages and the flow ratio in the second step are dependent upon the type of solvent and concentrations of vanadium and other impurities in the extracted solution of phosporic acid obtained in the first step. The concentration of phosphoric acid used in the second washing step 0 to 30%, preferably 10–25% and most preferably 15–25% $P_2O_5$. The number of the stages is preferably 3 – 40 and the flow ratio of extracted solution to washing solution is preferably about 20 : 1 to 3 : 1. In the above-mentioned continuous extraction-purification operation, the pentavalent vanadium compounds may be contacted with the reducing agent as follows:

The crude phosphoric acid containing the pentavalent vanadium compounds may be contacted with the reducing agent before the first step by continuously or batchwise admixing said acid with dried or wet powdered activated carbon, for example, if necessary in the form of a slurry in water or phosphoric acid. The mixture is stirred so that sufficient contact is achieved and then the solid is separated by a filtration, centrifugal separation, sedimentation, or the like method. The phosphoric acid supernatant is fed to the first step. It is also possible to feed the phosphoric acid without prior solid-liquid separation.

The amount of powdered activated carbon is preferably 4 – 20 times by weight (dry) the $V^{5+}$ of the pentavalent vanadium compounds. It is unnecessary to add more than 20 times by weight of activated carbon to the $V^{5+}$ and the load for the solid-liquid separation will be too great at higher than 20 times by weight of active carbon to $V^{5+}$. On the contrary, reduction is incomplete at lower than 4 times by weight of active carbon to $V^{5+}$. The time for contacting the powdered activated carbon with the crude phosphoric acid may be less than several hours to several minutes, and the contact temperature is room temperature. The crude phosphoric acid containing the pentavalent vanadium compound contains substantially no organic compounds. Granular activated carbon can be used instead of powdered activated carbon. A column filled with granular activated carbon may alternatively be used.

An example using a ferrous (chloride) compound as the reducing agent will be now illustrated: Other suitable ferrous compounds include ferrous sulfate, ferrous hydroxide, ferrous phosphate or the like. The ferrous chloride may be used as a solid, as a solution or as a solution in aqueous phosphoric acid solution. The ferrous chloride solution is added continuously or batchwise to the crude phosphoric acid containing pentavalent vanadium compounds. The amount of ferrous chloride should be more than a stoichiometric amount, preferably 1 – 5 equivalents of the pentavalent vanadium compound. It is preferable to have an excess of $Fe^{2+}$ in the crude phosphoric acid.

It is possible to use iron powder instead of a ferrous compound. However, when iron powder is used, the ferric compounds in the crude phosphoric acid will be reduced to ferrous compounds. Since, the presence of ferric ions is useful for separation of impurities in the extraction, the use of iron powder is not preferable for the separation of titanium or other impurities. When activated carbon is used, the ferric compounds will not be reduced. Accordingly, the use of activated carbon is preferable to the use of iron powder. The ferrous compounds reduce the pentavalent vanadium compounds and are converted to the corresponding ferric compounds.

When sodium sulfide is used as a reducing agent, it is preferable to add 5 times by weight of sodium sulfide ($Na_2S$) to the $V^{5+}$ of the pentavalent vanadium compounds in the crude phosphoric acid. When the heavy metal compounds and the fluorosilicate ions in the crude phosphoric acid are removed, a further excess of sodium sulfide is preferably added.

When the crude phosphoric acid treated according to the above step of the invention to substantially reduce pentavalent vanadium compounds to tetra- or tri-valent vanadium compounds, is fed to the first step, the extracted solution of phosphoric acid which will result from the first step, will contain substantially no vanadium components. Small amounts of vanadium components in the extracted solution are easily removed from the extracted solution by washing with pure phosphoric acid.

The process for reducing the pentavalent vanadium compound during the first or second steps will now be illustrated: The reducing agent may be added to the extracted solution or to the aqueous solution at certain stages of the first step or to the extracted phosphoric acid solution obtained in the first step. It is also possible to add it to the extracted solution or to the aqueous solution in the course of the second step. When the reduction is performed in the middle of the second step, the amount of the reducing agent required will be minimized. It is possible to add an aqueous phosphoric acid solution containing ferrous chloride reducing agent to a middle stage of the counter-current multi-stage mixer-settler in the second step. The ratio of the ferrous chloride solution to pentavalent vanadium compound is preferably about 1.1 – 5 by weight (Fe/V) in the extracted solution discharged from the adjacent stage in the upperstream.

When granular activated carbon is used as the reducing agent, the pentavalent vanadium compounds may be reduced by passing the extracted solution or the aqueous solution through a column filled with granular activated carbon, in the second step. When the reduction is performed in the second step, the same effect can be achieved with about one-third the reducing agent used in reducing the crude phosphoric acid, or with about one-half that used in reducing during the first step. The pure phosphoric acid containing substantially no vanadium components can be used in foods, medicines, pure chemicals and the like. Removal of vanadium thus substantially broadens the scope of its application.

Having generally described the invention, a further understanding can be obtained by certain specific examples which are provided herein for purposes of illustration only and are not intended to be limiting in any manner.

EXAMPLE 1

Crude wet process phosphoric acid prepared by treating calcined phosphate rock with sulfuric acid and which has the following composition was used.

| | |
|---|---|
| $P_2O_5$ | 31% |
| $V^{5+}$ | 179 mg/l |
| total – V | 180 mg/l |

Crystalline ferrous chloride was added to the crude phosphoric acid in a ratio of 2 times by weight of $Fe^{2+}$ to $V^{5+}$ and the mixture was well mixed to dissolve the solid. An analysis of the crude phosphoric acid obtained by the wet process, showed only a trace of vanadium compounds was present. The phosphoric acid treated with the reducing agent was fed to one end of a 10-stage continuous counter-current mixer-settler extraction battery to continuously and counter-currently contact the solution with isobutyl alcohol saturated with water. The volume ratio of the phosphoric acid solution to the isobutyl alcohol solution was 1 : 5, whereby the extracted solution of phosphoric acid shown in Table 1 was obtained in a normal fashion. The extracted solution of phosphoric acid was fed to one end of a 5-stage counter-current mixer-settler to continuously and counter-currently contact the solution with pure phosphoric acid ($P_2O_5$ of 20.1%) containing no vanadium components in a volume ratio of extracted solution to pure phosphoric acid of 10 : 1, whereby the vanadium components in the extracted solution were removed by the washing of the extracted solution. The resulting extracted solution of pure phosphoric acid was contacted with pure water to recover substantially the phosphoric acid, and the phosphoric acid was concentrated to obtain pure phosphoric acid containing substantially no vanadium components.

Table 1

| | Concentration of $H_3PO_4$ | Concentration of total vanadium |
|---|---|---|
| Extracted solution of phosphoric acid | 93 g/l | 4 mg/l |
| Pure phosphoric acid | 75.1 wt. % | 0.51 ppm |

Table 1-continued

| | Concentration of $H_3PO_4$ | Concentration of total vanadium |
|---|---|---|
| acid | | |

EXAMPLE 2

Powdered activated carbon was added to the crude phosphoric acid of Example 1 in a ratio of 12.5 kg to 1 kg of $V^{5+}$ components in the phosphoric acid. The mixture was mixed for about 1 hour and the activated carbon was removed by filtration. An analysis of the filtrate showed only a trace of $V^{5+}$ was present. The process of Example 1 was repeated except that n-butanol was used as the solvent. The phosphoric acid was recovered from the filtrate to obtain pure phoshoric acid having $H_3PO_4$ of 74.9% and total vanadium of 0.6 ppm.

REFERENCE 1

The process of Example 1 was repeated except that the reduction with ferrous chloride was omitted. As shown in Table 2, the separation of the vanadium components was incomplete.

Table 2

| | Concentration of $H_3PO_4$ | Concentration of total vanadium |
|---|---|---|
| Extracted solution of phosphoric acid | 92 g/l | 18 mg/l |
| Pure phosphoric acid | 75.2% | 68 ppm |

EXAMPLE 3

A reducing agent was added to crude wet process phosphoric acid in the ratios of a. 5 times by weight of sodium sulfide ($Na_2S$),
b. 6 times by weight of stannous chloride ($SnCl_2$),
c. 2 times by weight of ferrous sulfate ($Fe^{2+}$), or
d. 1 time by weight of ferrous phosphate ($Fe^{2+}$) to $V^{5+}$ in the crude phosphoric acid. The treated phosphoric acid was contacted with isoamyl alcohol as the solvent to extract the phosphoric acid as set forth in Example 1. As a result, pure phosphoric acid containing substantially no vanadium components was obtained in each case.

EXAMPLE 4

The crude phosphoric acid of Example 1 was fed to one end of a 10-stage continuous counter-current mixer-settler to continuously and counter-currently contact the acid with a solvent of n-butanol saturated with water, in a volume ratio of 1 : 5, to which 2% by volume of 35% hydrochloric acid had been added. The extracted solution of phosphoric acid shown in Table 3 was obtained in a normal fashion. The extracted solution of phosphoric acid was fed to one end of a 6-stage counter-current mixer-settler to continuously and counter-currently contact the solution with pure phosphoric acid ($P_2O_5$ of 19.9%) containing no vanadium components in a volume ratio of 10 : 1. Phosphoric acid ($P_2O_5$ of 20% by weight) containing ferrous chloride in the amount of 200 g/l as Fe was continuously fed to the third stage (from the inlet of the extracted solution) of the mixer-settler in the ratio of two times by weight $Fe^{2+}$ to $V^{5+}$ in the extracted solution of the second stage. Phosphoric acid was substantially recovered by extracting the resulting solution of pure phosphoric acid with water. The phosphoric acid was concentrated to obtain pure phosphoric acid containing substantially no vanadium components, as shown in Table 3. The amount of ferrous chloride to crude wet process phosphoric acid was about one-third of that used in Example 1.

Table 3

|  | Concentration of $H_3PO_4$ | Concentration of total vanadium |
|---|---|---|
| Extracted solution of phosphoric acid | 94 g/l | 19 mg/l |
| Pure phosphoric acid | 75.1 % | 0.6 ppm |

EXAMPLE 5

The process of Example 4 was repeated except that activated carbon was added to the extracted solution of phosphoric acid obtained in the first stage of a 10-stage counter-current mixer-settler instead of ferrous chloride in a ratio of 12.5 times by weight of $V^{5+}$ in the extracted solution. The activated carbon was removed and the filtrate was fed to the second step of a 6-stage mixer-settler. As the result, pure phosphoric acid containing substantially no vanadium components was obtained.

EXAMPLE 6

The process of Example 1 was repeated except that aqueous phosphoric acid ($P_2O_5$ 35% and $V^{5+}$ 100 mg/l) which was prepared by oxidizing crude phosphoric acid prepared by acid-decomposition of uncalcined phosphate rock with sulfuric acid was used. As a result, pure phosphoric acid containing substantially no vanadium components was obtained.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for purification of crude phosphoric acid prepared by the wet process produced by the decomposition of calcined phosphate rock with sulfuric acid or by the decomposition of uncalcined phosphate rock with sulfuric acid and deoxidizing and decolorizing the product wherein the crude wet process phosphoric acid contains pentavalent vanadium compounds, which comprises extracting said crude phosphoric acid with a $C_3$–$C_8$ aliphatic alcohol by first counter-currently contacting said crude phosphoric acid with said aliphatic alcohol and second washing the extracted solution of phosphoric acid obtained in the first step with aqueous phosphoric acid, with the proviso that at least one agent for the reduction of pentavalent vanadium is added to one of said process steps after formation of said crude phosphoric acid.

2. The process for purification of claim 1, wherein the compound for reducing the pentavalent compounds is a powdered or granular activated carbon, ferrous compound, iron powder, stannous compound, tin powder, hydrogen sulfide or sodium sulfide.

3. The process for purification of claim 1, wherein the compound for reducing the pentavalent vanadium compounds is added in the second step.

4. The process for purification of claim 1, wherein the crude phosphoric acid is oxidized before contacting with the compound for reducing the pentavalent vanadium compounds.

5. The process for purification of claim 1, wherein the compound for reducing the pentavalent vanadium compounds is added in more than a stoichiometric amount to the pentavalent vanadium compounds.

6. The process for purification of claim 1, wherein more than 4 times by weight (dry) of powdered or granular activated carbon to $V^{5+}$ of the pentavalent vanadium compounds is added.

7. The process for purification of claim 1, wherein crude phosphoric acid is prepared by acid-decomposition of calcined phosphate rock.

8. The process for purification of claim 1, wherein activated carbon is added to crude phosphoric acid to reduce the pentavalent vanadium compounds.

9. The process for purification of claim 1, wherein the reducing agent is selected from the group consisting of powdered and granular activated carbon.

10. The process for purification of claim 1, wherein crude phosphoric acid is prepared by acid-decomposition of uncalcined phosphate rock.

11. The process for purification of claim 1, wherein activated carbon is added to the extracted solution of phosphoric acid obtained from the first counter-current contacting step to reduce the pentavalent vanadium compounds.

12. The process of claim 1, wherein activated carbon is added to said crude phosphoric acid in said first counter-current contact step.

* * * * *